United States Patent [19]
Lehmann

[11] Patent Number: 5,183,577
[45] Date of Patent: Feb. 2, 1993

[54] PROCESS FOR TREATMENT OF WASTEWATER CONTAINING INORGANIC AMMONIUM SALTS

[75] Inventor: Richard W. Lehmann, Wausau, Wis.

[73] Assignee: Zimpro Passavant Environmental Systems, Inc., Rothschild, Wis.

[21] Appl. No.: 817,157

[22] Filed: Jan. 6, 1992

[51] Int. Cl.$^5$ .......................... C02F 1/74; C02F 11/08
[52] U.S. Cl. ....................................... 210/761; 210/903
[58] Field of Search ............... 210/743, 750, 761, 762, 210/766, 774, 903

[56] References Cited

U.S. PATENT DOCUMENTS

| | | | |
|---|---|---|---|
| 2,824,058 | 2/1958 | Zimmermann | 210/761 |
| 3,359,200 | 12/1967 | Gitchel et al. | 210/761 |
| 3,714,911 | 2/1973 | Pradt | 110/761 |
| 3,876,497 | 4/1975 | Hoffman | 162/189 |
| 4,013,560 | 3/1977 | Pradt | 210/152 |
| 4,141,828 | 2/1979 | Okada et al. | 210/762 |
| 4,234,426 | 11/1980 | Wilhelmi et al. | 210/149 |
| 4,294,706 | 10/1981 | Kakihara et al. | 210/762 |
| 4,699,720 | 10/1987 | Harada et al. | 210/762 |
| 5,053,142 | 10/1991 | Sorensen et al. | 210/761 |

FOREIGN PATENT DOCUMENTS 1051210 2/1959 Fed. Rep. of Germany ...... 210/761

Primary Examiner—Thomas Wyse
Attorney, Agent, or Firm—Michael, Best & Friedrich

[57] ABSTRACT

A process for treating an aqueous wastewater containing ammonium compounds. The process comprises the steps of preheating a liquid influent and introducing the preheated influent, an oxygen-containing gas an the wastewater into a reaction vessel for undergoing wet oxidation. An oxidized effluent is then withdrawn from the reaction vessel, which includes a gas phase containing ammonia and carbon dioxide and a liquid phase containing the ammonium compounds. The temperature of the effluent is then reduced to a temperature sufficient to condense a substantial portion of the ammonia into the liquid phase, and afterwards the remaining gas phase containing a substantial portion of the carbon dioxide is separated from the resulting liquid phase. Either prior to or subsequent to the separation the pH of the liquid phase is adjusted to a level whereby a substantial portion of the ammonia remains in the liquid phase when the liquid phase is subsequently subjected to an elevated temperature above the boiling point of water and the water content of the pH-adjusted liquid phase is then reduced by evaporation.

21 Claims, 5 Drawing Sheets

PROCESS FOR TREATMENT OF WASTEWATER CONTAINING INORGANIC AMMONIUM SALTS

BACKGROUND OF THE INVENTION

This invention relates to wastewater treatment and, more particularly, to wet oxidation processes for treating wastewaters containing high concentrations of inorganic ammonium salts, such as ammonium sulfate.

Wet oxidation is used for oxidizing a compound while in solution. In a typical wet oxidation process, an oxygen-containing gas is incorporated into the wastewater influent, the influent preheated to initiate the reaction, and the preheated influent is introduced into a reaction vessel. The exothermic oxidation reaction heats the reaction mixture in the reaction vessel to an elevated temperature, therefore many wet oxidation processes typically include some sort of heat exchange scheme for recovering heat energy from the reaction vessel effluent.

In addition to employing heat exchangers for recovering heat from the reaction vessel effluent, wet oxidation processes typically include separation means for degassing the reaction vessel effluent. Some processes direct the effluent and the hot gases generated in the reaction vessel separately away from the reaction vessel (hot separation). U.S. Pat. No. 3,714,911 discloses hot separation where the effluent is passed through a heat exchanger to preheat the influent. In the oxidation processes disclosed in U.S. Pat. Nos. 3,359,200, 3,876,497 and 4,013,560 the energy from the reaction mixture is recovered in a similar manner but without first separating the gas stream. Only after the mixture has been cooled are the gases of reaction and the effluent separated (cold separation).

U.S. Pat. No. 4,234,426 discloses alternative wet oxidation processes in which steam is generated by heat recovered from the reaction vessel effluent. In one embodiment, the generated gas stream alone (hot separation) is removed from the reaction vessel and passed through a series of heat exchangers, first to generate steam and then to exchange heat between the gas stream and the influent. In the other embodiment, the entire reaction mixture, comprising combined effluent and gas streams, is passed through the heat exchangers and subsequently separation into the gas and liquid streams (cold separation).

The effluent can be further treated, either to recover certain of the components or simply to condition the effluent for discharge to the environment. Hot separation produces a more concentrated effluent because separation occurs in the upper portion of the reaction vessel where the effluent temperature is at its highest from the exothermic wet oxidation reaction. Consequently, the gas stream from the reaction vessel contains a relatively large proportion of evaporated water at this point, leaving a much smaller proportion of water in the liquid effluent stream. The condensate produced during cooling of the gas stream is treated separately, often through biological processes.

Wastewaters from the production of a variety of industrial chemicals such as acrylonitrile or caprolactam have a high concentration of ammonium compounds, as well as various other combustibles. Ammonium sulfate, present in the raw wastewaters, is also produced in the wet oxidation reaction. The effluent is typically further treated to recover the sulfur or solid ammonium sulfate (AMS). Ammonium sulfate in the effluent preferably is concentrated as much as possible before it is fed to a sulfur recovery boiler or an AMS crystallizer. A more dilute solution puts increased energy demands on the boiler or crystallizer to evaporate the water. To achieve this concentration in a hot separation process, the reaction vessel must be run at higher temperatures, in effect driving a higher portion of the liquid phase into the gas stream as vapor.

Ammonium salts decompose into ammonia and an acid when heated, the salts of weaker acids decomposing at lower temperatures than the salts of stronger acids. If the reaction vessel contains a liquid having a high ammonium content, the gas stream will have a high ammonia content and the hotter the reaction the higher the amount of ammonia in the gas stream. In addition to ammonia and water vapor, such a gas stream contains residual oxygen, carbon dioxide, low concentrations of volatile hydrocarbons and may contain nitrogen. If the ammonia and carbon dioxide concentrations in the condensate produced by cooling the gas stream are high enough, ammonium carbonate (or ammonium bicarbonate) will form as a solid. The ammonium carbonate is partially soluble in water. If the amount of water in the condensate is insufficient to dissolve all the ammonium carbonate, the undissolved or unsuspended solids will form a scale and will eventually plug the piping, particularly in the heat exchangers.

In a hot separation process of such wastes a significant fraction of the water is removed in the liquid effluent, containing the ammonium sulfate. The gas stream usually does not contain sufficient water vapor, subsequently condensed into water, for dissolving all of the ammonium carbonate solids that form in the condensate.

There is difference between wet oxidation of these wastes using air versus pure oxygen. Wet oxidation of acrylonitrile waste with air and using hot separation to get a concentrated brine solution is possible, but the vapor coolers must be operated at relatively warm temperatures to prevent formation of the ammonium carbonate or bicarbonate, as when the off gas/condensate is left a bit warmer the carbonate/bicarbonate solids either do not form or are soluble enough to not create fouling problems. If the gas/condensate flow gets too cool, the exchangers will plug.

Wet oxidation of acrylonitrile wastewater using pure oxygen and hot separation is more problematic. When using pure oxygen, the nitrogen component of air is avoided, which affects the system. The nitrogen acts to dilute the carbon dioxide and ammonia gases, and therefore reduces the carbonate/bicarbonate solids formation in the gas/condensate. The increased non-condensable gas concentration over the condensable gas concentration increases the ratio of water to $CO_2/NH_3$ through normal evaporation. Therefore, there is more water relative to the $CO_2/NH_3$ component of the gas phase available to dissolve any solids that may form from that component.

Consequently, it is difficult to accomplish hot separation in a continuous process with wastewaters from the production of acrylonitrile. If conditions are maintained so that the ammonium sulfate liquid stream is concentrated enough to be fed directly to conventional sulfur recovery processes the amount of ammonia relative to condensable water in the gas stream from the reaction vessel will be so high as to cause fouling problems. The condensate from a hot separation process would also contain high ammonia concentrations that would be difficult to treat before disposal.

Thus, conventional wet oxidation processes with hot separation may not be suited for treating wastewaters from the production of acrylonitrile or similar ammonium salt containing wastewaters.

SUMMARY OF THE INVENTION

An object of this invention is to provide an improved wet oxidation process for treating wastewaters containing ammonium compounds.

Another object of this invention is to provide such a process where the ammonium containing liquid phase can be concentrated to a high degree without creating plugging and fouling problems.

A further object of this invention is to provide a process in which cold separation of a carbon dioxide containing gas and the oxidized effluent occurs before concentration of the effluent for further processing, thereby facilitating control of the ammonia content in the condensate from the concentration of the effluent.

A still further object of the invention is to provide such a wet oxidation process having efficient energy recovery.

This invention provides a wet oxidation process which can be used with wastewaters having high ammonium compound concentrations, while avoiding many of the materials problems of conventional wet oxidation processes. The process comprises the steps of preheating a liquid influent and introducing the preheated influent, an oxygen-containing gas and the wastewater into a reaction vessel for undergoing wet oxidation. When the influent is wastewater, the preheating initiates the oxidation reaction. Subsequently the oxidized effluent is withdrawn from the reaction vessel. This effluent has a gas phase containing ammonia and carbon dioxide and a liquid phase containing the ammonium compounds. In a preferred embodiment, the effluent is passed through a first heat exchanger for cooling and energy recovery. This heat exchanger can be used to produce steam for use in the process or for other purposes.

The effluent is then passed in a heat exchange relationship with the influent, preferably through a second heat exchanger, to preheat the influent. The effluent temperature is subsequently cooled sufficiently to condense a substantial portion of the ammonia remaining in the gas phase into the liquid phase. A third heat exchanger can be used to accomplish this cooling. The liquid phase is then separated from the remaining gas phase, which now contains a substantial portion of the effluent carbon dioxide, but very little ammonia. The remaining gas phase can be further treated as needed for disposal.

Either prior to or subsequent to the separation of the gas and liquid phases, the pH of the liquid phase is adjusted to a level whereby a substantial portion of the ammonia remains in the liquid phase when the liquid phase is subsequently subjected to an elevated temperature above the boiling point of water. The liquid phase is finally subjected to evaporation to reduce the water content for further treatment. Steam generated by the first heat exchanger can be used as a heat source for this evaporation. The evaporation of the liquid phase is preferably effected in a multi-effect evaporator.

Other features and advantages of the invention will become apparent to those of ordinary skill in the art upon review of the following detailed description, claims, and drawings.

DESCRIPTION OF THE PREFERRED EMBODIMENT

Figure 1:
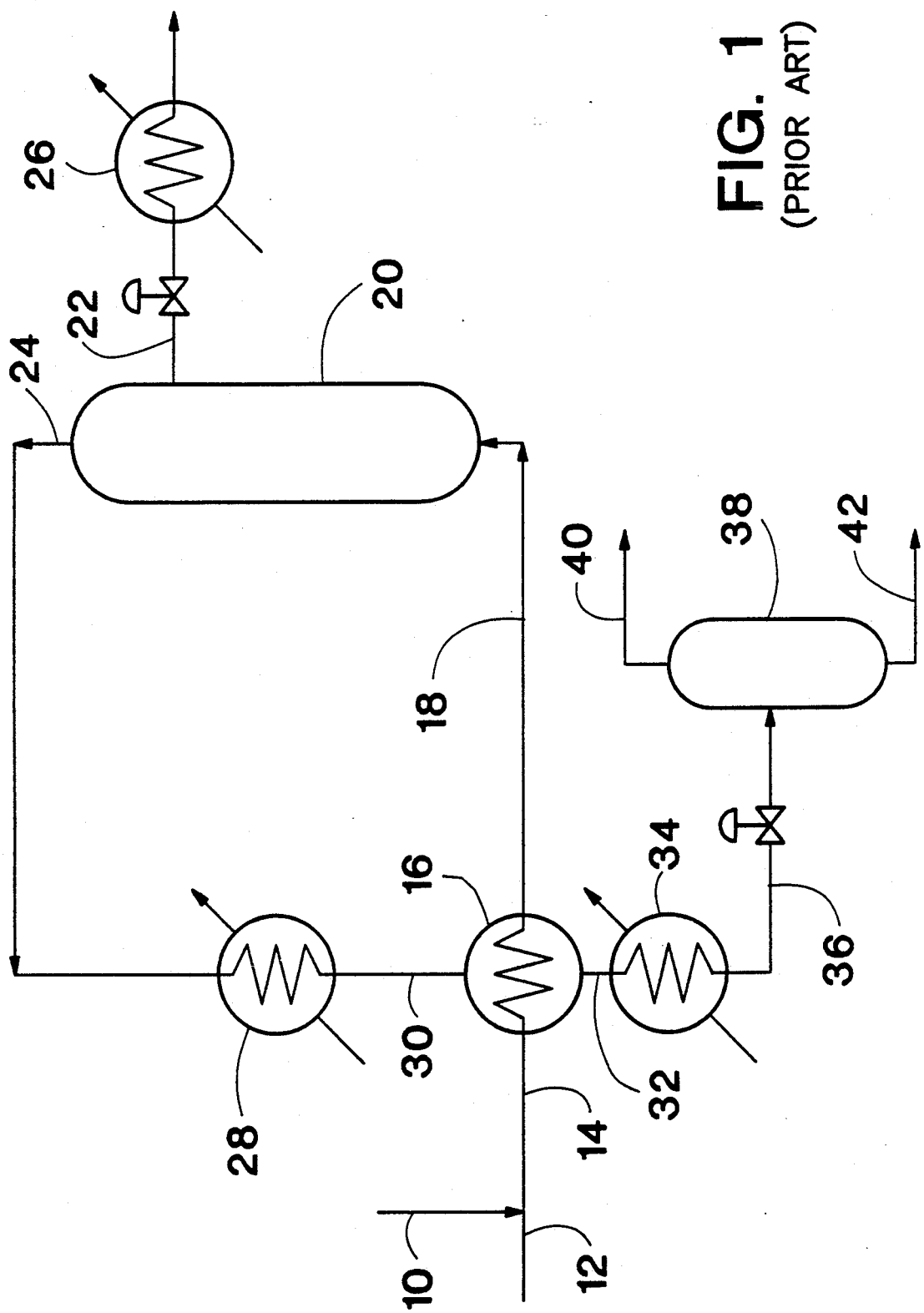
FIG. 1 is a schematic flow diagram of a prior art process for treating wastewater containing high concentrations of ammonium sulfate.

FIG. 1 illustrates a prior art process for wet oxidation of aqueous wastes resulting from acrylonitrile production. An oxygen-containing gas, such as air, is introduced via a conduit 10 and admixed with the wastewater from an acrylonitrile process in a conduit 12. The resulting influent flows through a conduit 14 to a heat exchanger 16 and is preheated in the heat exchanger 16 to a temperature which initiates the wet oxidation reaction. The preheated influent is introduced into a wet oxidation reaction vessel 20 via a conduit 18. The exothermic wet oxidation reaction in the reaction vessel 20 produces a reaction product containing ammonium sulfate.

The reaction product is separated into liquid and gas effluents in the upper portion of the reaction vessel 20. A liquid stream containing ammonium sulfate is withdrawn through a conduit 22 and a gas stream containing gases and liquid components evaporated during the wet oxidation reaction is withdrawn through a conduit 24. This separation requires some type of liquid level control device (not illustrated) within the operating reaction vessel 20. The oxidation condition subjects this level control device to an extremely corrosive environment and so it must be produced of special materials and specially serviced.

A significant fraction of the water leaves the reaction vessel 20 in the liquid effluent. The liquid effluent from the reaction vessel 20 is cooled by passage through a heat exchanger 26 and fed directly to a treatment process (not shown) for recovering sulfur from the ammonium sulfate.

The gas stream from the reaction vessel 20 passes through a heat exchanger 28 for energy recovery and then through a conduit 30 to the influent heat exchanger 16 for preheating the wastewater passing therethrough. A gas stream withdrawn from heat exchanger 16 through a conduit 32 typically is cooled, for instance by passing it through a heat exchanger 34, producing a condensate, or liquid phase, and a gas phase. The gas/liquid mixture exiting from heat exchanger 34 passes through a conduit 36 to a liquid/gas separator 38. A gas stream is withdrawn from the separator 38 through a conduit 40 and is vented to the atmosphere or further treated. A liquid stream is withdrawn from the separator 38 through a conduit 42 and routed to a biological process (not shown) for further treatment. In this process the gas and evaporated liquid components are separated from the liquid phase in a relatively high pH environment in the reaction vessel 20 and removed together in the gas stream through a conduit 24. This may lead to fouling of the tubings of the heat exchangers 28, 16 and/or 34 by ammonium carbonate which forms during cooling.

Figure 2:
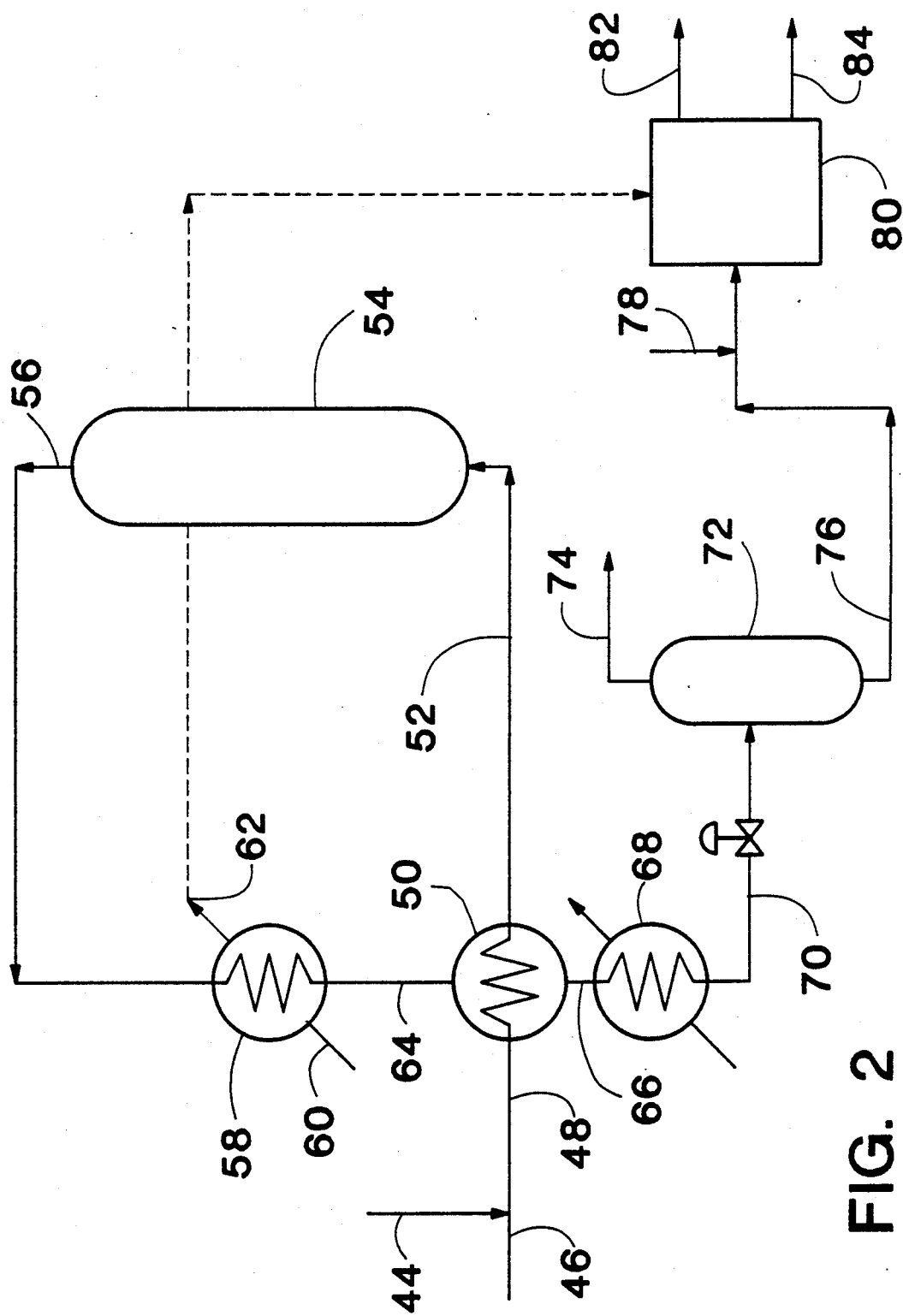
FIG. 2 is a schematic flow diagram of the wastewater treatment process of the invention.

FIG. 2 illustrates a preferred process provided by the invention for wet oxidation treatment of a wastewater containing high ammonia concentrations, such as wastewater from the production of acrylonitrile. An oxygen-containing gas, such as air, is introduced through a conduit 44 and admixed with the wastewater flowing through a conduit 46, forming an influent which flows through a conduit 48 to a preheater, preferably a heat exchanger 50. The influent is preheated and the wet oxidation reaction initiated as it passes through the heat exchanger 50. The preheated influent is introduced through a conduit 52 into the reaction vessel 54 where the wet oxidation reaction occurs. This can be a continuous process.

When the wastewater being treated is from acrylonitrile production, the oxygen-containing gas mixed with the influent is preferably relatively pure oxygen. This minimizes corrosion and/or fouling of the tubing of the heat exchanger 50 normally caused when such a wastewater is heated to an elevated temperature in the absence of oxygen.

An effluent including a gas phase containing ammonia and carbon dioxide and a liquid phase containing ammonium compounds is withdrawn from the reaction vessel 54 through a conduit 56. This flow scheme avoids the severe service for a level control device as required in FIG. 1. The effluent can be passed through a first heat exchanger 58 for energy recovery. The heat exchanger 58 preferably employs water as a coolant, introduced by a conduit 60, and is operated to produce steam which is removed through a conduit 62.

The cooled effluent from the first heat exchanger 58 passes through a conduit 64 and through the heat exchanger 50 to preheat the wastewater influent sufficiently to initiate the wet oxidation reaction.

The cooled effluent passes through a conduit 66 to a third heat exchanger 68, which is preferably operated to reduce the effluent temperature sufficiently to condense a substantial portion of the ammonia into the liquid phase. A gas/liquid stream from the third heat exchanger 68 is introduced via a conduit 70 into a conventional liquid/gas separator 72 in which the remaining gas phase is separated from the condensed liquid phase. A gas stream containing a relatively small proportion of the ammonia originally in the effluent from reaction vessel, but a substantial portion of the carbon dioxide, is withdrawn from the separator 72 through a conduit 74 and treated as needed for disposal.

A liquid stream containing dissolved ammonia is withdrawn from the separator 72 through a conduit 76. The pH of this liquid stream is adjusted, i.e., reduced, to a level where a substantial portion of the ammonia remains in the liquid phase when subsequently subjected to an elevated temperature above the boiling point of water. For example, a sufficient amount of a suitable acid, such as sulfuric acid, can be introduced through a conduit 78 to reduce the pH to between about 5.0 and about 6.5, preferably about 5.5 to about 6.0. The pH-adjusted liquid stream is then concentrated by evaporation, preferably in a multiple effect evaporator 80. The evaporation reduces the water content of the liquid stream to facilitate further treatment. Steam generated in the first heat exchanger 58 can be used as a heat source for this evaporation, as illustrated by the dashed line in FIG. 2.

The evaporated components of the liquid stream introduced into the evaporator 80 are withdrawn through a conduit 82 and condensed. The resulting condensate can be transferred directly to a biological treatment system (not illustrated), because it contains low levels of ammonia by virtue of the pH adjustment before evaporation. A concentrated liquid, withdrawn from the evaporator 80 through a conduit 84, can be transferred to a furnace (not illustrated) for sulfur recovery, such as in a smelting furnace or to a crystallizer for AMS recovery.

Figure 2A:
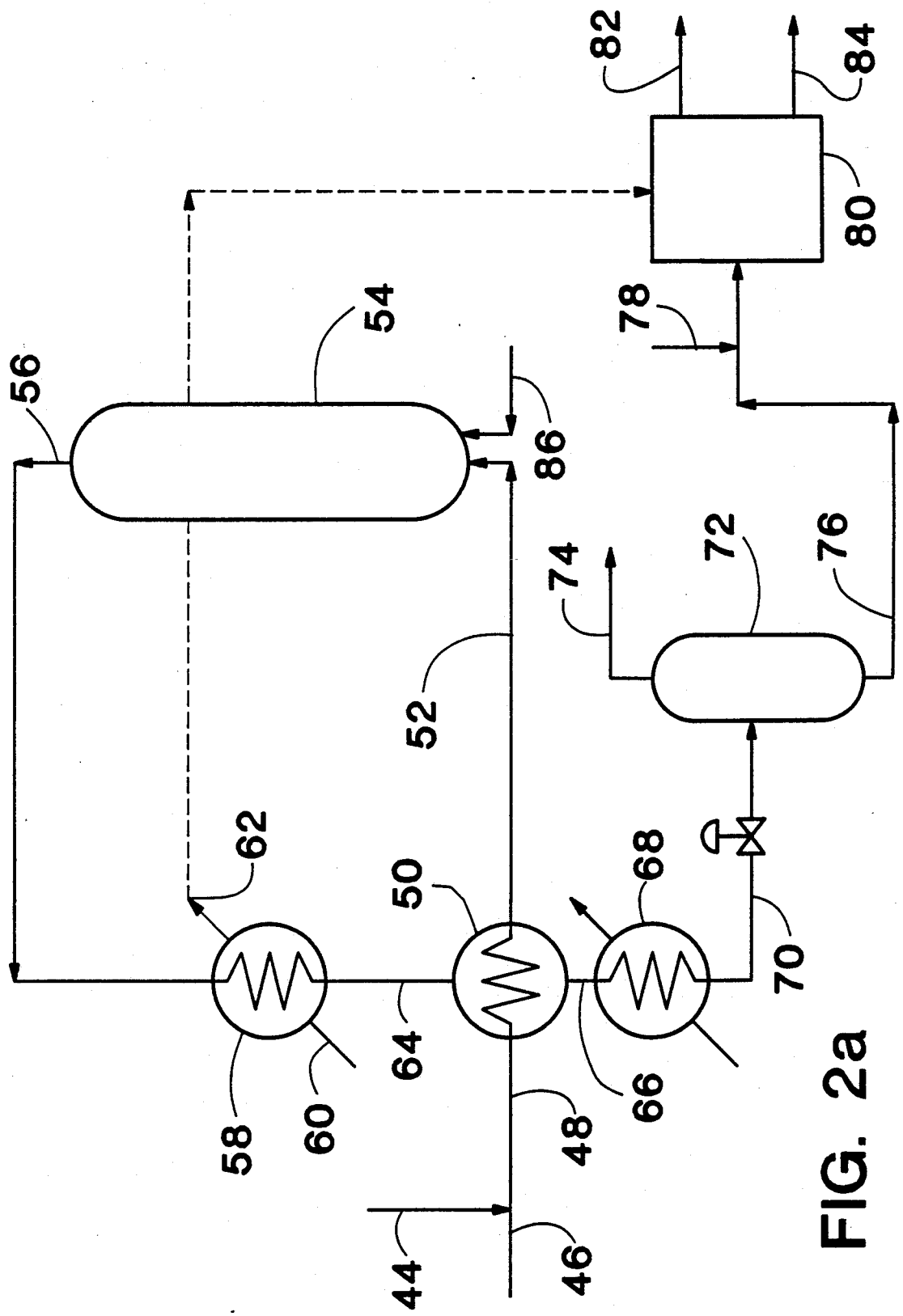
FIGS. 2a-2c are schematic diagrams of alternative embodiments to the wastewater treatment process of FIG. 2.

In an alternative embodiment, illustrated in FIG. 2a, the raw wastewater is injected directly into the reactor through a separate conduit 86. This requires a carrier liquid, e.g., tap water for carrying the oxygen containing gas. The carrier liquid is introduced through the conduit 46 in place of the wastewater. In this embodiment, the additional water added to the system must be removed downstream of the reactor before sulfur or AMS recovery, and thus it is more applicable for wastewaters containing higher concentrations of ammonium salts. Typical wastewater from acrylonitrile production may be too dilute for this embodiment to be practical.

Figure 2B:
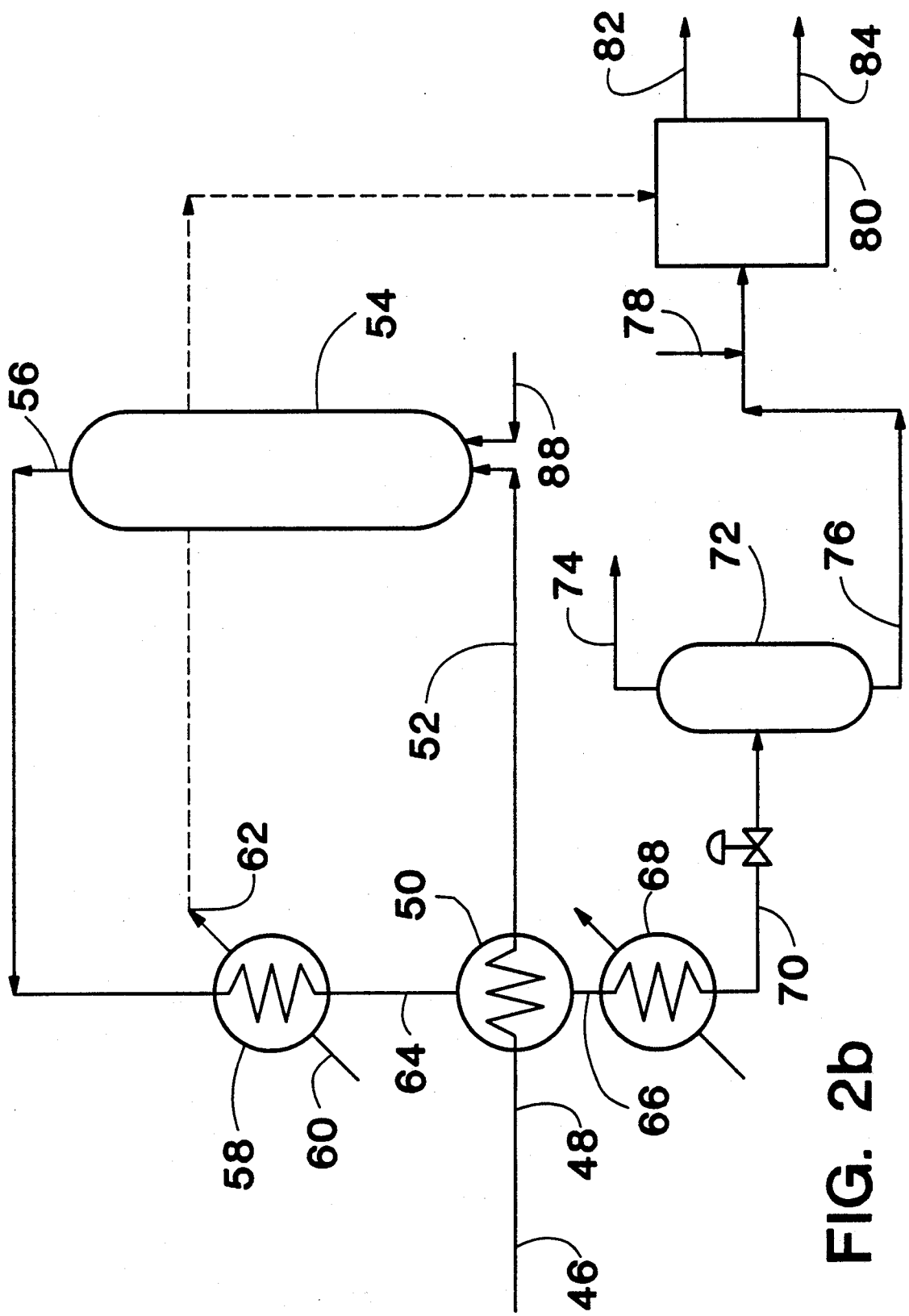

In another alternative embodiment, illustrated in FIG. 2b, the oxygen containing gas is added directly to the reactor through a separate conduit 88. This embodiment is more applicable for wastewaters that, even when not oxygenated, would not tend to foul the influent heat exchanger 50. A liquid/gas mixture provides better heat exchanger characteristics than liquid alone, so this embodiment is less preferred for wastewater from acrylonitrile production. However, it can be used with less concentrated and less corrosive wastewaters.

Figure 2C:
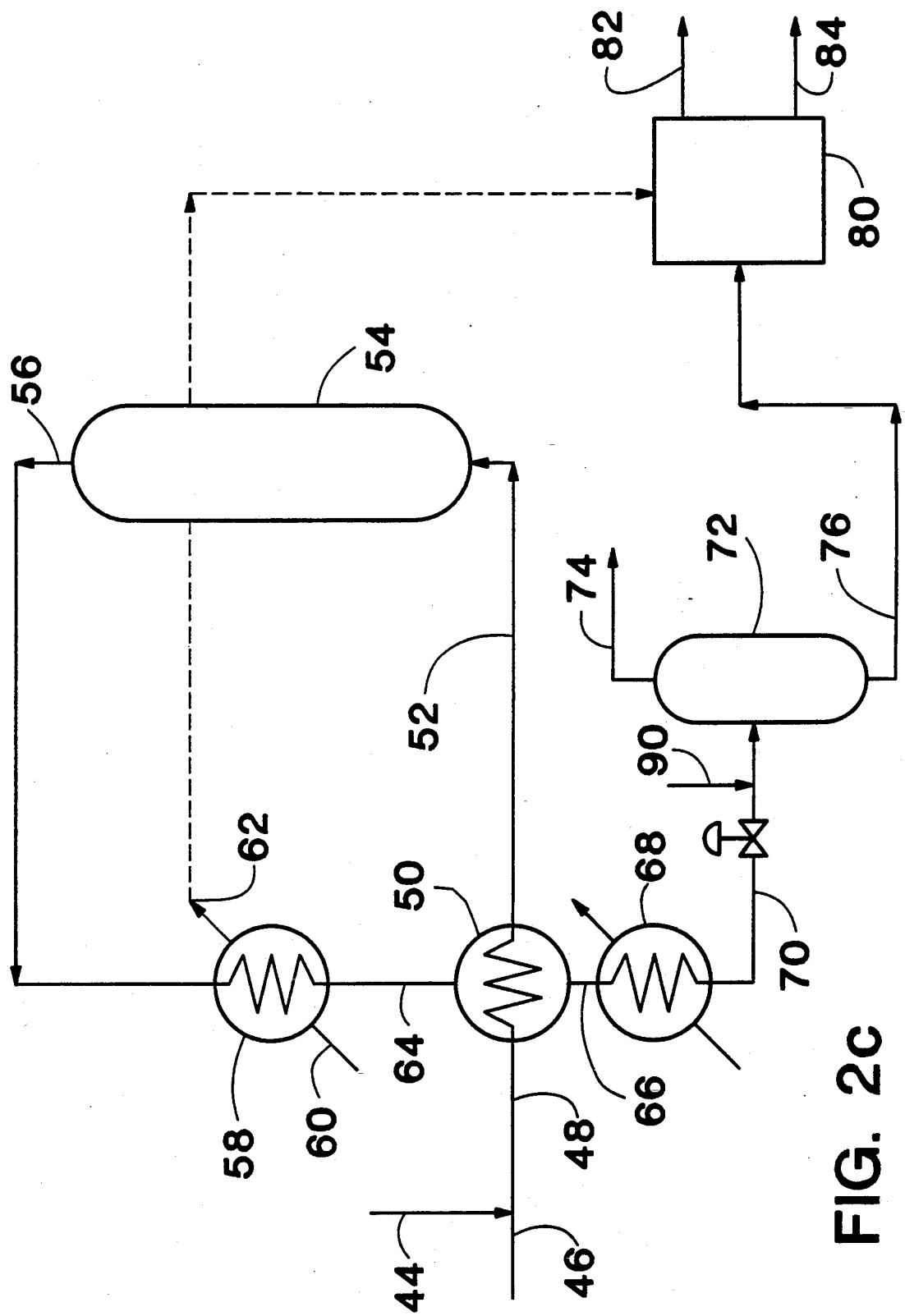

Finally, in the alternative embodiment illustrated in FIG. 2c, the pH adjustment to the liquid phase is effected by adding an acid through a conduit 90 to the separated liquid phase in the conduit 70 upstream of the separator 72. The degassed liquid phase from the separator 72 passes via the conduit 76 directly into the evaporator 80 without further treatment.

When the process of the invention is used for the wet oxidation of wastewater from the production of acrylonitrile, a highly concentrated ammonium sulfate solution is produced in the evaporator 80. The liquid stream from the separator 72 can be safely concentrated in the multiple effect evaporator 80 to about 40% ammonium sulfate solids or even higher. Based on current data for treating wastewaters from acrylonitrile production, the concentration of ammonium sulfate in the liquid effluent from the reaction vessel 20 in the process illustrated FIG. 1 cannot be reduced to much more than 15–18% without an additional concentration step. Preconcentrations of the incoming wastewater generally is not a viable alternative because concentrated influents tend to foul equipment used to accomplish concentration of the wastewater.

In either separation process, some ammonia remains in the condensate, which is removed through the conduit 42 in the FIG. 1 process and through the conduit 82 in the FIG. 2 process. In either case, the condensate will require treatment in a biological process. As discussed above, altering either the temperature or the pH affects the amount of ammonia in the condensate. In the process of the invention, the ammonia content of the condensate can be easily and reliably controlled by adjusting the pH of the liquid stream introduced into the evaporator 80. Additionally, in the process of FIG. 2, a substantial portion of the carbon dioxide in the effluent from the reaction vessel is removed with the gas stream withdrawn from the separator 72 via the conduit 74. Thus, there is only a small amount of carbon dioxide in the gas generated by evaporation at evaporator 80. This greatly reduces the potential for ammonium carbonate formation in a subsequent condensation of the evaporate. The reduced ammonia concentration the condensate, such as would form in the conduit 82, also reduces the load on the biological process ultimately used in treating the condensate.

In order to reduce the pH before concentration of the wet oxidation in the process illustrated in FIG. 1, such an adjustment would have to be made in the reaction vessel 20. This would make the reaction solution much more corrosive, alter the reaction conditions and negatively affect the materials of construction. Operation of a pilot plant employing a process like that illustrated in FIG. 1 at a high oxidation temperature and with relatively high purity oxygen has resulted in plugging problems in gas overhead lines, e.g., the conduit 24. On the other hand, a process like that illustrated in the FIG. 2 has been operated for several weeks at high temperatures and with relatively high purity oxygen without such plugging problems.

Laboratory tests have been performed on samples of ammonium sulfate containing effluent from wet oxidation of an aqueous wastewater from the production of acrylonitrile, equivalent to condensate withdrawn from the separator 72 via the conduit 76 in the process illustrated in FIG. 2. The pH of these samples were adjusted and then processed through a laboratory scale distillation unit to demonstrate the relationship between inlet pH and ammonia content of the condensate. The pH of the wastewater was initially 8.54. The pH of three samples were reduced to 6.5, 6.0 and 5.5 by the addition of sulfuric acid [Note: type acid], and the samples subsequently subjected to a laboratory distillation process to simulate the operation of the evaporator 80. For each sample, 75% of the feed wastewater volume was collected as condensate, equivalent to condensate removed from the evaporator 80 via the conduit 82, and the condensation analyzed for ammonia content. The resulting condensate samples contained 2990 mg/l, 473 mg/l and 321 mg/l of ammonia nitrogen, respectively. This demonstrates how the simple step of lowering the pH prior to evaporative concentration can greatly reduce the ammonia content of the condensate.

Another advantage of the process of the invention is improved energy recovery because fewer heat exchangers can be used than in many previous processes. For example, the process illustrated in FIG. 1 requires two separate effluent streams from the reaction vessel 20, a gas stream withdrawn through the conduit 24 and a liquid stream through the conduit 22. Both streams exit the reaction vessel at the maximum process temperature and both must be cooled to near ambient conditions, thus requiring a primary heat exchanger 26 and 28 for the liquid and gas streams, respectively. On the other hand, the process of the invention employs a single effluent stream which is withdrawn from the reaction vessel through the conduit 56 and requires only one heat exchanger 58 for primary cooling, thereby maximizing energy recovery at this stage. In the preferred embodiment, steam generated in the primary heat exchanger 58 is employed as the heat source for concentrating the partially cooled effluent in the evaporator 80 and the partially cooled effluent is used to preheat the influent via the heat exchanger 50, thereby recovering and utilizing a relatively large proportion of the energy generated by the oxidation reaction.

From the foregoing description, one skilled in the art can make various changes and modifications to adopt the invention to various usages and conditions without departing from the spirit and scope of the invention.

What is claimed is:

1. A process for treating an aqueous wastewater containing ammonium compounds, said process comprising the steps of:
   (a) preheating a liquid influent;
   (b) introducing said preheated influent, an oxygen-containing gas and said wastewater into a reaction vessel for undergoing wet oxidation;
   (c) withdrawing from said reaction vessel an oxidized effluent including a gas phase containing ammonia and carbon dioxide and a liquid phase containing said ammonium compounds;
   (d) reducing the temperature of said effluent to a temperature sufficient to condense a substantial portion of said ammonia into said liquid phase;
   (e) separating the remaining gas phase containing a substantial portion of said carbon dioxide from the resulting liquid phase;
   (f) adjusting the pH of said liquid phase either prior to or subsequent to step (e) to a level whereby a substantial portion of said ammonia remains in said liquid phase when said liquid phase is subsequently subjected to an elevated temperature above the boiling point of water; and
   (g) reducing the water content of said pH-adjusted liquid phase by evaporation.

2. A process according to claim 1 wherein said liquid influent is said wastewater.

3. A process according to claim 2 wherein said oxygen containing gas is admixed with said wastewater prior to said preheating step.

4. A process according to claim 1 wherein said liquid influent is water and said oxygen containing gas is admixed with said water prior to said preheating step.

5. A process according to claim 1 wherein step (d) is carried out by passing said effluent through a first heat exchanger.

6. A process according to claim 5 wherein said first heat exchanger employs a heat transfer fluid as a coolant.

7. A process according to claim 6 wherein said heat transfer fluid is water and said heat exchanger is operated to produce steam.

8. A process according to claim 7 wherein steam from said first heat exchanger is used as a heat source for step (g).

9. A process according to claim 1 wherein said influent is preheated by passing said influent in a heat exchange relationship with said effluent.

10. A process according to claim 1 wherein in step (f) the adjusted pH is greater than about 5.0 and less than about 6.5.

11. A process according to claim 10 wherein the adjusted pH is greater than about 5.5 and less than about 6.0.

12. A process according to claim 1 wherein step (g) is carried out in a multi-effect evaporator.

13. A process for treating an aqueous wastewater containing ammonium compounds, said process comprising the steps of:
   (a) preheating a liquid influent;
   (b) introducing said preheated influent, an oxygen-containing gas and said wastewater into a reaction vessel for undergoing wet oxidation;

(c) withdrawing from said reaction vessel an oxidized effluent including a gas phase containing ammonia and carbon dioxide and a liquid phase containing said ammonium compounds;

(d) passing said effluent in a heat exchange relationship with said influent to effectuate said preheating of said influent;

(e) reducing the temperature of said effluent to a temperature sufficient to condense a substantial portion of said ammonia into said liquid phase;

(f) separating the remaining gas phase containing a substantial portion of said carbon dioxide from the resulting liquid phase;

(g) adjusting the pH of said liquid phase either prior to or subsequent to step (f) to a level greater than about 5.0 and less than about 6.5; and (h) reducing the water content of said pH-adjusted liquid phase by evaporation.

14. A process according to claim 13 wherein said liquid influent is said wastewater.

15. A process according to claim 14 wherein said oxygen containing gas is admixed with said wastewater prior to said preheating step.

16. A process according to claim 13 wherein said liquid influent is water and said oxygen containing gas is admixed with said water prior to said preheating step.

17. A process according to claim 13 wherein step (e) is carried out by passing said effluent through a first heat exchanger.

18. A process according to claim 17 wherein said first heat exchanger employs water as a coolant and is operated to produce steam.

19. A process according to claim 18 wherein steam from said first heat exchanger is used as a heat source for step (h).

20. A process according to claim 13 wherein the adjusted pH is greater than about 5.5 and less than about 6 0.

21. A process according to claim 13 wherein step (h) is carried out in a multi-effect evaporator.

* * * * *